United States Patent
Lin

(10) Patent No.: US 7,598,944 B2
(45) Date of Patent: Oct. 6, 2009

(54) SYSTEM AND METHOD FOR MEASURING OPERATIONAL LIFE OF A COMPUTER MOUSE WHEEL

(75) Inventor: Guang-Hong Lin, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 546 days.

(21) Appl. No.: 11/309,697

(22) Filed: Sep. 15, 2006

(65) Prior Publication Data

US 2007/0085831 A1 Apr. 19, 2007

(30) Foreign Application Priority Data

Oct. 19, 2005 (CN) .................. 2005 1 0100554

(51) Int. Cl.
*G06F 3/033* (2006.01)
(52) U.S. Cl. ...................................... 345/167
(58) Field of Classification Search .......... 345/163–167
See application file for complete search history.

(56) References Cited

U.S. PATENT DOCUMENTS

| 5,029,292 | A | * | 7/1991 | Zajicek | 345/165 |
| 5,652,604 | A | * | 7/1997 | Cheng | 345/167 |
| 6,326,951 | B1 | * | 12/2001 | Cheng | 345/167 |
| 7,305,330 | B2 | * | 12/2007 | Urakami et al. | 703/2 |
| 2003/0201951 | A1 | | 10/2003 | Chin | |
| 2005/0200606 | A1 | * | 9/2005 | Willemin et al. | 345/166 |
| 2007/0075972 | A1 | * | 4/2007 | Lin | 345/163 |

FOREIGN PATENT DOCUMENTS

TW  M252018  12/2004

\* cited by examiner

*Primary Examiner*—Chanh Nguyen
*Assistant Examiner*—Adam J Snyder
(74) *Attorney, Agent, or Firm*—Winston Hsu

(57) ABSTRACT

An exemplary system for measuring operational life of a computer mouse wheel is disclosed. The system includes a computer (10), a control card (11), a stepper motor servo controller (12), a stepper motor (13), a vertical servo axle (14), and a measurement platform (15). The vertical servo axle is structured and arranged for maintaining contacting with the computer mouse wheel (16). The computer is configured for sending an instruction for controlling operations of measuring the operational life of the computer mouse wheel, and includes a file module (20), a setting module (21), and a performing module (22). The control card is configured in the computer. A related method is also disclosed.

8 Claims, 3 Drawing Sheets

SYSTEM AND METHOD FOR MEASURING OPERATIONAL LIFE OF A COMPUTER MOUSE WHEEL

FIELD OF THE INVENTION

The present invention is generally related to systems and methods for measuring operational life of computer peripheral devices, and more particularly, is related to a system and method for measuring an operational life of a computer mouse wheel.

DESCRIPTION OF RELATED ART

A computer mouse wheel is a small object able to slide along a hard, flat surface. As the computer mouse wheel moves, the pointer on the display screen is configured to move in the same direction. A computer mouse wheel contains at least one button and sometimes as many as three, each button having different functions depending on the computer program is running. There are three basic types of computer mice, mechanical, optomechanical, and optical. A mechanical mouse has a rubber or a metal ball in its underside configured to roll in all directions. The mechanical mouse has mechanical sensors to detect a rolling direction of the ball and moves the screen pointer accordingly. An optomechanical mouse is similar to the mechanical mouse, but uses optical sensors to detect the rolling direction of the ball. An optical mouse uses a laser to detect the mouse's movement. The mouse must move along a special surface so that the optical mechanism has a frame of reference. Optical mice have no moving mechanical parts. They respond more quickly and accurately than mechanical and optomechanical mice, but they are also more expensive.

With the rapid development of computers, an operational expectation for every accessory of a computer is required to possess a better precision and a better mobility than their previous models. A stability and an operational life of the computer mouse are also important. In fact, the production process of a computer mouse is relatively easy. What is important is that the computer mouse must pass many strict requirements before leaving factories. These requirements include function measurement, reliability measurement, and so on. The reliability measurement further includes a life expectancy measurement of key-presses, operational life measurement of a computer mouse wheel and so on. However, nowadays, many measurements for a computer mouse wheel are not applied, more particularly, there is a lack of professional systems and methods for measuring the operational life of the computer mouse wheel.

Therefore, what is needed is a system and method for measuring the operational life of the computer mouse wheel accurately and reliably.

SUMMARY OF INVENTION

One embodiment provides a system for measuring operational life of a computer mouse wheel. The system includes a vertical servo axle being structured and arranged for maintaining contacting with the computer mouse wheel; a stepper motor connected with the vertical servo axle and controlling the vertical servo axle to do up-and-down movements which in response driving the computer mouse wheel to roll in opposite directions; a computer configured for setting a total running distance for the computer mouse wheel according to a standard operational life specification of the computer mouse wheel, setting running tasks for the computer mouse wheel according to the total running distance, and sending an instruction for controlling operations of measuring operational life of the computer mouse wheel following the running tasks; a stepper motor servo controller electrically connected between the computer and the stepper motor for sending an impulse control signal to control operation of the stepper motor; and a control card configured in the computer for controlling the stepper motor servo controller to send the impulse control signal to the stepper motor to drive the vertical servo axle and the computer mouse wheel to run following the running tasks.

Another embodiment provides a method for measuring operational life of a computer mouse wheel. The method includes the steps of: (a) initializing a communication port for a computer, in order that the computer communicates with a stepper motor servo controller via the communication port; (b) setting a total running distance for the computer mouse wheel according to a standard operational life specification of the computer mouse wheel; (c) setting running tasks for the computer mouse wheel according to the running measurement distance; (d) sending an instruction for controlling operations of measuring operational life of the computer mouse wheel following the running tasks; (e) receiving and processing the instruction from the computer, and sending a control signal to a stepper motor servo control; and (f) sending an impulse control signal to a stepper motor to drive a vertical servo axle and the computer mouse wheel to run following the running tasks, in order to check whether the computer mouse wheel completes all the running tasks to meet the standard operational life specification of the computer mouse wheel.

Other objects, advantages and novel features of the embodiments will be drawn from the following detailed description together with the attached drawings, in which:

DETAILED DESCRIPTION

Figure 1:
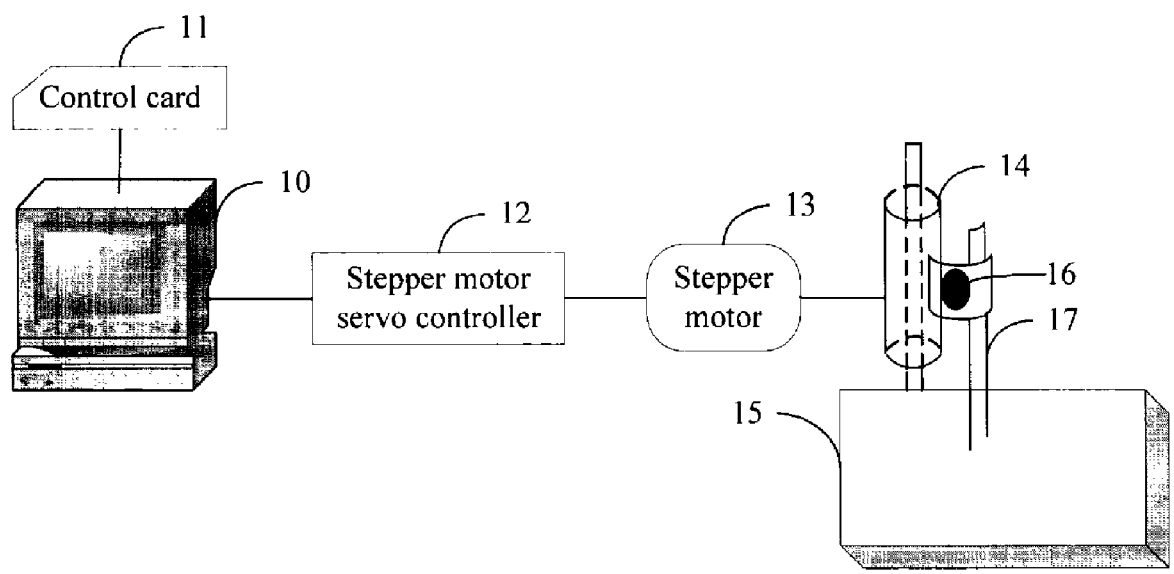
FIG. 1 is a schematic diagram of a hardware configuration of a system for measuring operational life of a computer mouse wheel in accordance with a preferred embodiment.

FIG. 1 is a schematic diagram of a hardware configuration of a system for measuring an operational life of a computer mouse wheel (hereinafter, "the system") in accordance with a preferred embodiment. The system includes a computer 10 with a control card 11 installed therein, a stepper motor servo controller 12, a stepper motor 13, and a measurement platform 15. A to-be-measured computer mouse wheel 16 (hereinafter simplied as computer mouse wheel) is fixed on an erect axle 17 which is fixed to the measurement platform 15 and extends therefrom. A vertical servo axle 14 is structured and arranged for maintaining contacting with the computer mouse wheel 16. The stepper motor 13 is connected to the vertical servo axle 14, and controls the vertical servo axle 14 to do up-and-down movements which in response driving the computer mouse wheel to roll in opposite directions. In the preferred embodiment, the control card 11 may be a PDC9120 control card that is a single-axis motion control card for the stepper motor servo controller 12.

The computer 10 is configured for setting a total running distance for the computer mouse wheel 16 according to a standard operational life specification of the computer mouse wheel 16. The computer 10 is further configured for setting running tasks for the computer mouse wheel 16 according to the total running distance, and sending an instruction for controlling operations of measuring operational life of the computer mouse wheel following the running tasks. The computer 10 is configured for sending instructions for controlling operations of measuring the operational life of the computer mouse wheel 16. The control card 11 is configured for receiving and processing the instructions, and sending a control signal to the stepper motor servo controller 12. The stepper motor servo controller 12 is electrically connected between the computer 10 and the stepper motor 13 and it is configured for sending an impulse control signal to the stepper motor 13 after receiving the control signal from the control card 11. The stepper motor 13 is configured for driving the vertical servo axle 14 and the computer mouse wheel 16 to run following the running tasks after receiving the impulse control signal in order to measure the operational life of the computer mouse wheel 16.

Figure 2:
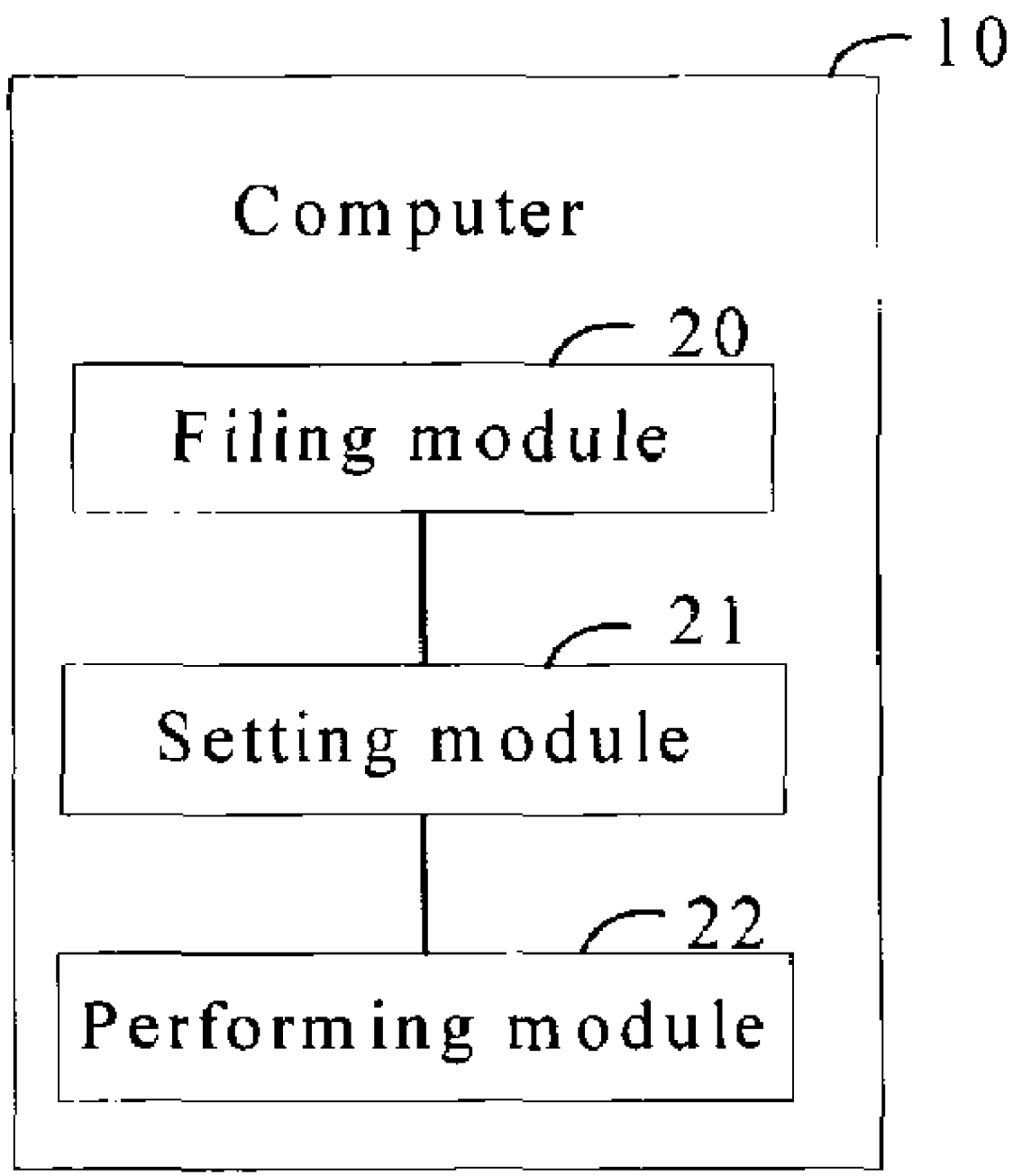
FIG. 2 is a schematic diagram of main function modules of the computer of the system of FIG. 1.

FIG. 2 is a schematic diagram of main function modules of the computer 10. The computer 10 includes a file module 20, a setting module 21, and a performing module 22.

The file module 20 is configured for receiving particular parameters corresponding to the computer mouse wheel 16 in a dialog box created by the computer 10, and for creating a new file using the parameters. The parameters may include a material number of the computer mouse wheel 16, a serial number of the computer mouse wheel 16, a total running distance, an identification number of the computer mouse wheel 16, and so on. The total running distance is set according to a standard operational life specification provided by the corresponding manufacturer of the computer mouse wheel 16. Furthermore, the file module 20 can open an existing file in the computer 10 to continue any unfinished operational life measurements. The setting module 21 is configured for setting running tasks for the computer mouse wheel 16 by setting particular parameters. The parameters may include running paths of the computer mouse wheel 16, a running speed corresponding to each running path, a rolling direction (including rolling forward and rolling backward), an interval time between the rolling forward and the rolling backward, and so on. A total distance of each running path adds up to the total running distance set in the file module 20. The running paths may include continuously rolling backward, continuously rolling forward, a combination thereof, and so on.

The performing module 22 is configured for signaling the computer 10 to send the instructions to the control card 11, controlling the control card 11 to process the instructions and send a control signal to the stepper motor servo controller 12, controlling the stepper motor servo controller 12 to send the impulse control signal to the stepper motor 13, thus, driving the vertical servo axle 14 and the computer mouse wheel 16 to roll in response to the running tasks. If the computer mouse wheel 16 completes all the running tasks, this indicates the operational life of the computer mouse wheel 16 meets the operational life specification.

Figure 3:
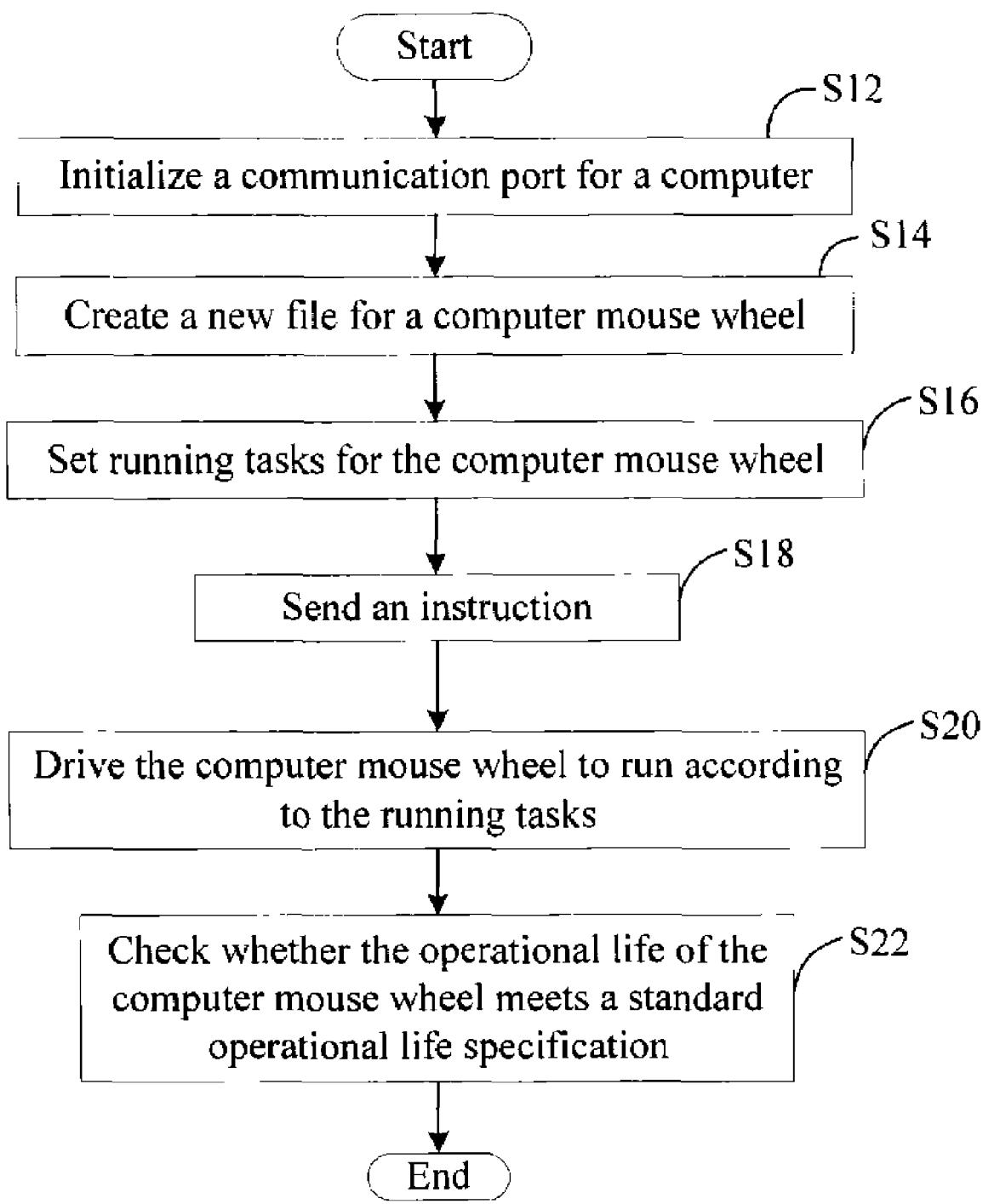
FIG. 3 is a flow chart of a preferred method for measuring operational life of a computer mouse wheel by utilizing the system of FIG. 1.

FIG. 3 is a flow chart of a preferred method for measuring operational life of the computer mouse wheel 16. In step S12, the computer 10 initializes a communication port such as a COM1 in order to communicate with the stepper motor servo controller 12 via the communication port. For example, if the communication port COM1 is set to be in use, the computer 10 communicates with the stepper motor servo controller 12 via the COM1. In step S14, the file module 20 receives particular parameters about the computer mouse wheel 16 in the dialog box of the computer 10, and creates the new file for the computer mouse wheel 16 using the parameters. The parameters may include the material number of the computer mouse wheel 16, the serial number of the computer mouse wheel 16, the total running distance, the identification number of the computer mouse wheel 16, and so on. The total running distance is set according to the standard operational life specification provided by the corresponding manufacturer of the computer mouse wheel 16. In step S16, the setting module 21 sets running tasks for the computer mouse wheel 16 by setting particular parameters. The parameters may include running paths of the computer mouse wheel 16, the running speed corresponding to each running path, the rolling direction (including rolling forward and rolling backward), the interval time between the rolling forward and the rolling backward, and so on. A total distance of each running path adds up to the total running distance set in the file module 20. The running paths may include continuously rolling backward, continuously rolling forward, a combination thereof, and so on. In step S18, the performing module 22 signals the computer 10 to send the instructions to the control card 11 for controlling operations of measuring operational life of the computer mouse wheel 16. In step S20, the control card 11 processes the instructions, sends a control signal to the stepper motor servo controller 12, controlling the stepper motor servo controller 12 to send the impulse control signal to the stepper motor 13 to drive the vertical servo axle 14, thus, the computer mouse wheel 16 will roll in response to the running tasks. In step S22, the users check whether the computer mouse 16 completes all the running tasks. If the computer mouse 16 completes all the running tasks, this indicates the operational life of the computer mouse 16 meets the operational life specification.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for measuring operational life of a computer mouse wheel, the system comprising:
    a vertical servo axle being structured and arranged for maintaining contacting with the computer mouse wheel;
    a stepper motor connected with the vertical servo axle and controlling the vertical servo axle to do up-and-down movements which in response driving the computer mouse wheel to roll in opposite directions;
    a computer configured for setting a total running distance for the computer mouse wheel according to a standard operational life specification of the computer mouse wheel, setting running tasks for the computer mouse wheel according to the total running distance, and sending an instruction for controlling operations of measuring operational life of the computer mouse wheel following the running tasks;
    a stepper motor servo controller electrically connected between the computer and the stepper motor for sending an impulse control signal to control operation of the stepper motor; and a control card configured in the computer for controlling the stepper motor servo controller to send the impulse control signal to the stepper motor to drive the vertical servo axle and the computer mouse wheel to run following the running tasks.

2. The system according to claim 1, wherein the computer comprises:

a file module for creating a new file for the computer mouse wheel by setting parameters, the setting parameters comprising the total running distance;

a setting module for setting running tasks for the computer mouse wheel by setting parameters; and a performing module for signaling the computer to send the instruction to the control card, controlling the control card to process the instruction and send a control signal to the stepper motor servo controller, controlling the stepper motor servo controller to send an impulse control signal to the stepper motor to drive the vertical servo axle and the computer mouse wheel to run following the running tasks.

3. The system according to claim 2, wherein the setting parameters for creating a new file further comprise a material number of the computer mouse wheel, a serial number of the computer mouse wheel, and an identification number of the computer mouse wheel.

4. The system according to claim 2, wherein the setting parameters for setting running tasks comprise running paths, a running speed corresponding to each running path, rolling directions, and an interval time between a rolling forward and a rolling backward.

5. The system according to claim 1, further comprising a standard communication port configured for a connection between the computer and the stepper motor servo controller.

6. A computer-based method for measuring operational life of a computer mouse wheel, the method comprising the steps of:

initializing a communication port for a computer, in order that the computer communicates with a stepper motor servo controller via the communication port;

setting a total running distance for the computer mouse wheel according to a standard operational life specification of the computer mouse wheel;

setting running tasks for the computer mouse wheel according to the running measurement distance;

sending an instruction for controlling operations of measuring operational life of the computer mouse wheel following the running tasks;

receiving and processing the instruction from the computer, and sending a control signal to a stepper motor servo control; and sending an impulse control signal to a stepper motor to drive a vertical servo axle and the computer mouse wheel to run following the running tasks, in order to check whether the computer mouse wheel completes all the running tasks to meet the standard operational life specification of the computer mouse wheel.

7. The method according to claim 6, wherein the step of setting running tasks comprises the step of:

setting particular parameters, the particular parameters comprising running paths of the computer mouse wheel, a running speed corresponding to each running path, rolling directions, and an interval time between a rolling forward and a rolling backward.

8. The method according to claim 7, wherein the running paths comprise continuously rolling backward, continuously rolling forward, a combination thereof.

* * * * *

UNITED STATES PATENT AND TRADEMARK OFFICE
CERTIFICATE OF CORRECTION

PATENT NO. : 7,598,944 B2
APPLICATION NO. : 11/309697
DATED : October 6, 2009
INVENTOR(S) : Guang-Hong Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Twenty-eighth Day of September, 2010

David J. Kappos
*Director of the United States Patent and Trademark Office*